May 19, 1936. N. BREWER 2,040,822
MACHINE AND METHOD FOR SEPARATING SOLIDS FROM LIQUIDS
Filed Aug. 31, 1932 5 Sheets-Sheet 3
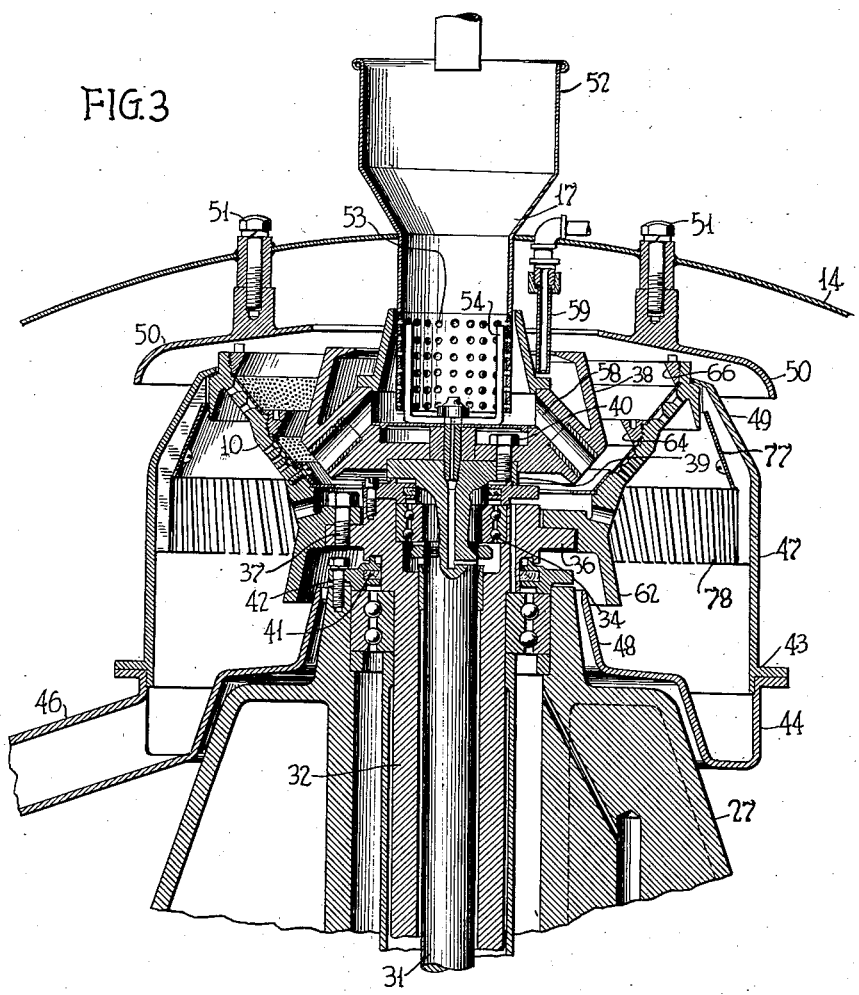
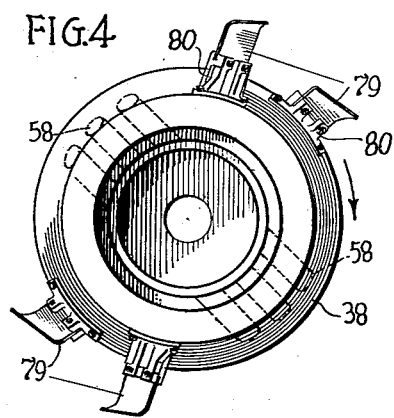
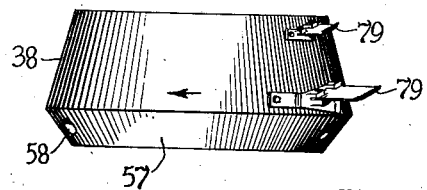
INVENTOR.
NATHANIEL BREWER
BY Maurice A. Crews
ATTORNEY.

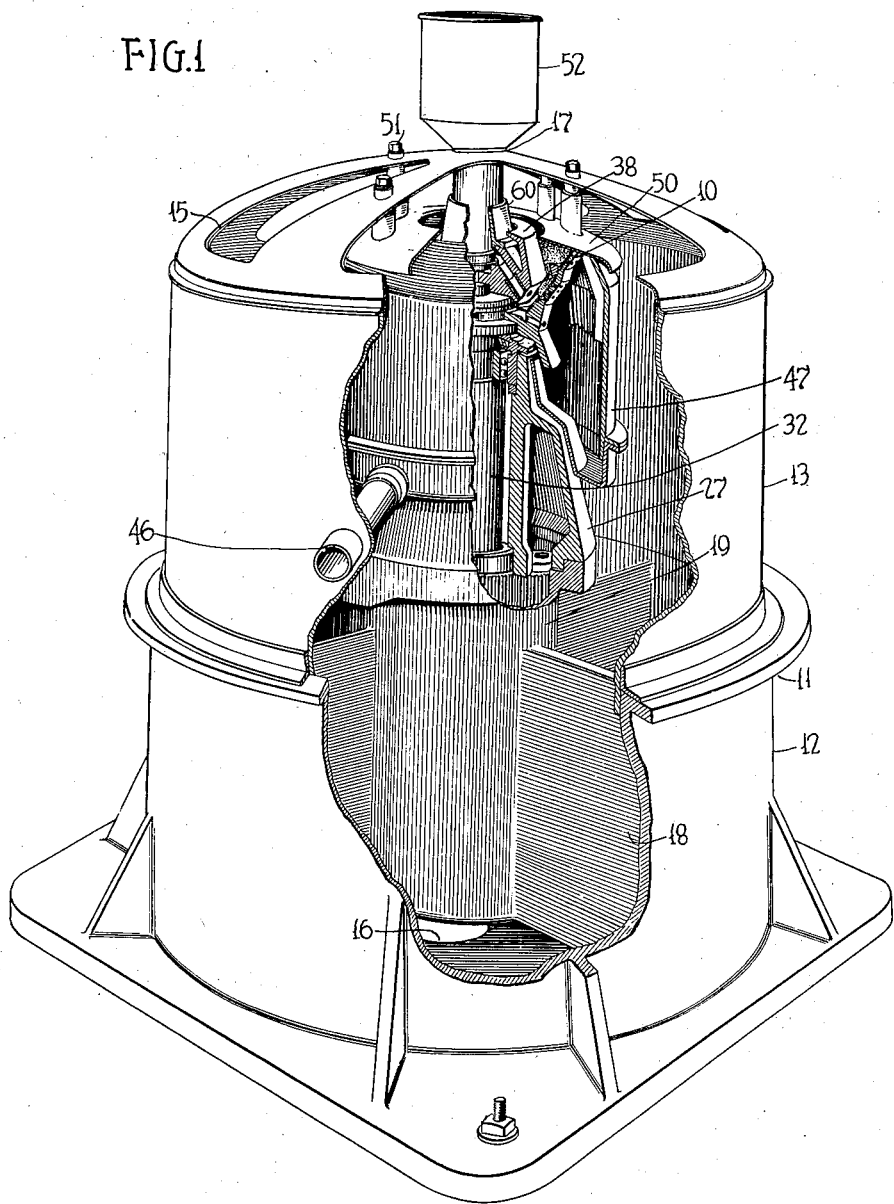

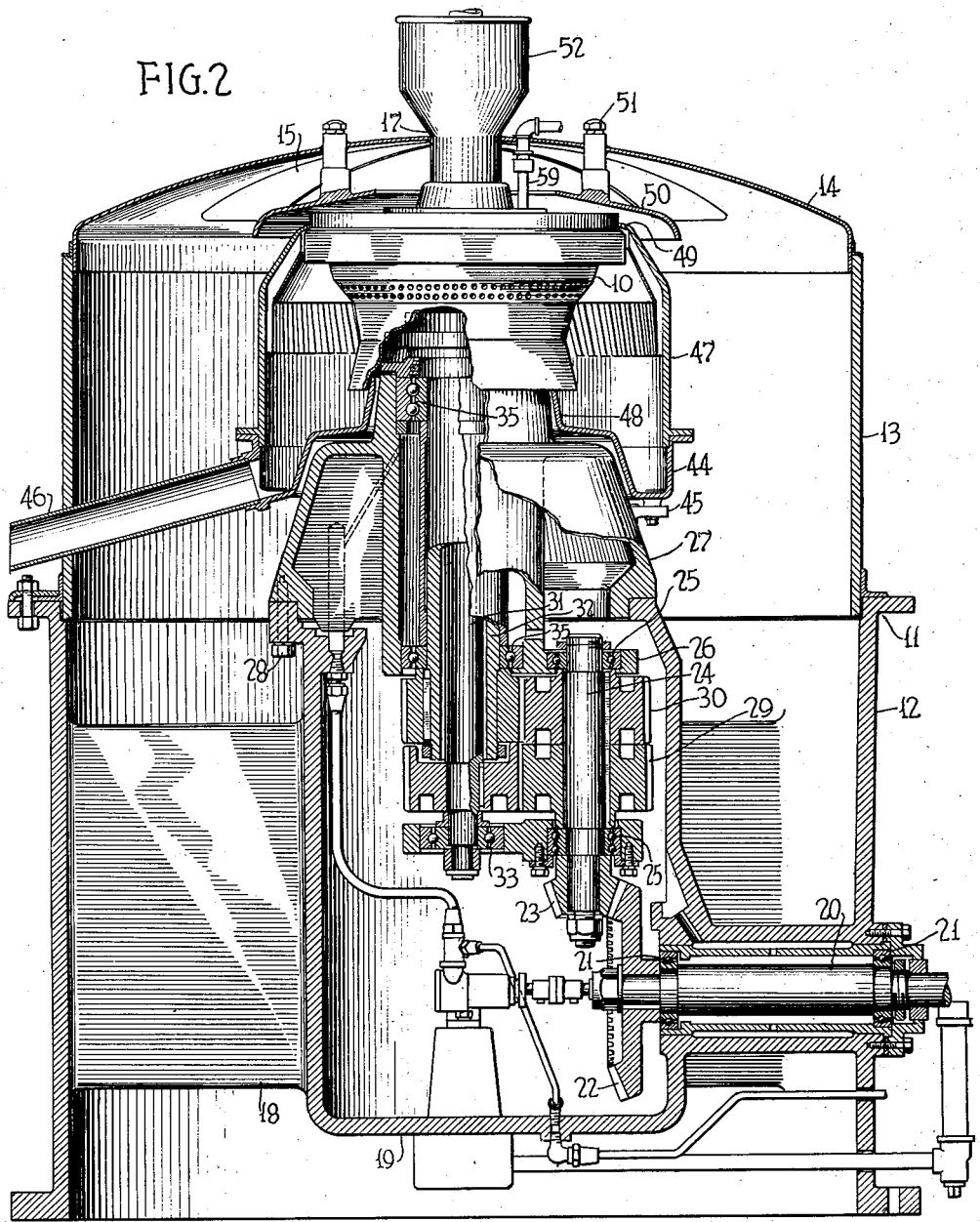

May 19, 1936. N. BREWER 2,040,822
MACHINE AND METHOD FOR SEPARATING SOLIDS FROM LIQUIDS
Filed Aug. 31, 1932 5 Sheets-Sheet 4

INVENTOR.
NATHANIEL BREWER
BY Maurice A. Crews
ATTORNEY.

May 19, 1936.   N. BREWER   2,040,822
MACHINE AND METHOD FOR SEPARATING SOLIDS FROM LIQUIDS
Filed Aug. 31, 1932   5 Sheets-Sheet 5

INVENTOR
NATANIEL BREWER
BY *Maurice R. Crews*
ATTORNEY

Patented May 19, 1936

2,040,822

UNITED STATES PATENT OFFICE 2,040,822

MACHINE AND METHOD FOR SEPARATING SOLIDS FROM LIQUIDS

Nathaniel Brewer, Lansdowne, Pa., assignor to The Sharples Specialty Company, Philadelphia, Pa., a corporation of Delaware Application August 31, 1932, Serial No. 631,180

9 Claims. (Cl. 210—69)

My invention pertains to the separation of solids from liquids and more particularly to the separation of small solid particles such as crystals from mother liquor or other liquids having a tendency to adhere to their surfaces. It has been my primary object to effect such a separation involving an adequate drying of the solids under treatment on a commercial scale in a rapid and continuous manner by a process and apparatus which enable me to obtain economies in space, equipment, time and expense over the use of any process or apparatus heretofore proposed for a similar purpose. Further objects and advantages of my invention which are inherent in the process and apparatus pertain to economies in the rinsing operation whereby only a relatively small amount of rinse water is required to effect a substantially perfect rinsing of the solids after the preliminary drying operation.

In the practice of the process of the invention, a slurry containing the solids from which the liquid is to be separated is fed continuously to a rotating bowl, the liquid and solids being continuously discharged through separate discharge openings without interruption of the rotation of the bowl. While centrifugal machines have been heretofore designed to perform such a continuous operation, they have been subject to the common defects that they have failed to effect a sufficient drying of the crystals and have failed to afford provision for an adequate rinsing of the crystals from which the mother liquor has been removed. The rinsing operation has accordingly required large quantities of rinse water which has entailed an objectionable solution and consequent loss of a considerable proportion of the mass of partially dried crystals. A further defect of this type of machine as developed in the prior art has been the tendency of a thin layer of liquid to adhere to the bowl wall by reason of surface tension and other physical causes, this layer of liquid discharging with the crystals and thus impairing the effectiveness of the drying operation. A still further defect of such machines has been their failure to effect an adequate control of the flow of crystals through the bowl or the impairment of the operation of the machine by the adverse incidental effect of means introduced to effect such control. In the development of my invention, I have avoided every one of these heretofore insuperable objections to the application of continuous centrifugal force to the problem at hand.

The invention involves, in its most important aspect, a preliminary drying of a mass of crystals under the influence of centrifugal force while feeding them through the bowl, followed by a deliberate retardation of the crystals and a further feed thereof in the same direction longitudinally of the bowl under the influence of a mechanical feeding device. The flow of the crystals during the first drying operation is preferably effected by centrifugal force and the drying is preferably accomplished by a straining operation in which the liquid passes outwardly through the perforate wall of the bowl under the influence of centrifugal force. The further mechanical feed of the crystals is preferably accomplished in opposition to the effect of centrifugal force by means which permit the layer of liquid adhering to the inner wall of the bowl to flow in an opposite direction, thus removing this film which might otherwise tend to discharge with the crystals.

A further feature of the invention consists in the provision of a multi-stage bowl in which a second straining and mechanical feeding operation follow the first such series of operations. Thus, the preliminary drying operation is effected in the first stage and the final drying is performed in one or more subsequent stages which are substantial duplicates of the first stage. Further features pertain to the provision of means for mechanically breaking up the crystal clusters prior to feeding them to the bowl and means for controlling the air currents induced by the rotation of the bowl to prevent them from causing a contamination of the discharged crystals with discharged liquid. Still further features pertain to details of machine design affording provision for ready adjustability of certain parts which are subject to wear and for the ready removability of other parts and their replacement to adapt the machine to operate on different types or grades of slurry.

Other objects and advantages of my invention and the manner in which I have attained them will be obvious from a reading of the following detailed description in the light of the attached drawings, in which, Figure 1 is a perspective view of the machine of my invention with parts cut away and parts shown in section for the sake of clearness.

Figure 2 is a longitudinal section through my machine illustrating the general arrangement of parts and the driving mechanism.

Figure 3 is a detail sectional view of the upper portion of the machine illustrating the feed and discharge features of the invention and the general construction of the centrifugal bowl.

Figure 4 is a plan view of a portion of the feed mechanism of the machine.

Figure 5 is a side elevation of the part illustrated in Figure 4.

Figure 6:
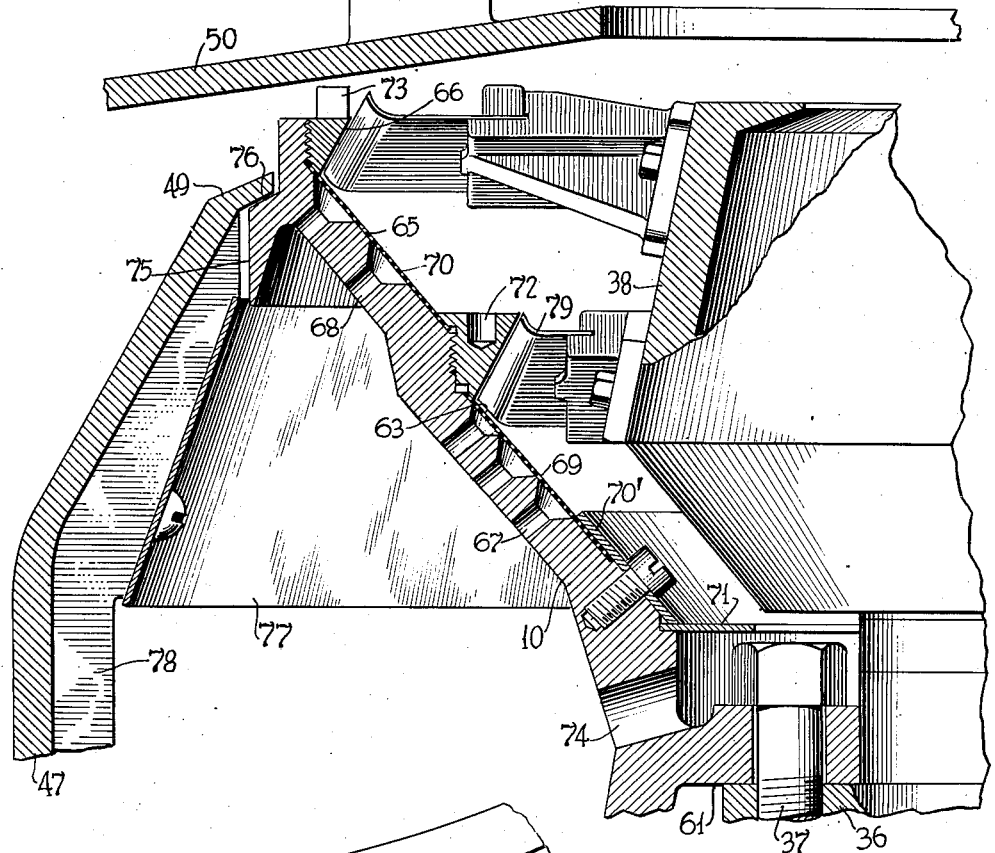
Figure 6 is a detail section illustrating the general structure of the bowl.
Figure 7:
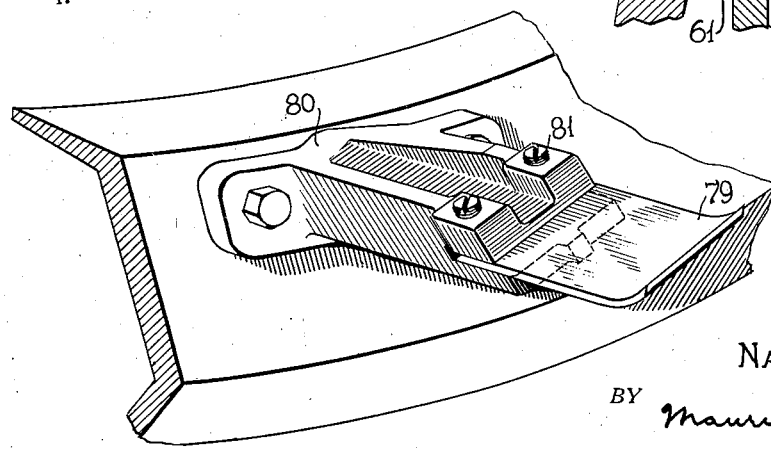
Figure 7 is a detail view of a plow for mechanically feeding the solids longitudinally of the bowl.

While my present application is not intended either as a continuation or a division of my prior application, Serial No. 582,902, filed December 24, 1931, it is closely related thereto in a number of its features and certain features illustrated and described in the present application but not claimed therein are subject to claims in that case.

In order to facilitate a better understanding of my invention as it relates both to the machine and the process I will first set forth the structure of the machine in the detailed description to follow, and will thereafter explain the method of its operation, and the process which it is designed to perform, with reference to the machine itself. In explaining my invention in this manner, I wish it to be distinctly understood that the machine and process are doubtless capable of independent application in many of their aspects.

Referring to the drawings by reference characters, the numeral 10 indicates the centrifugal rotor and the numeral 11 the frame or casing in which it is contained. This frame comprises a base portion 12 and a top portion 13 having a cover 14 mounted upon its upper open end. This cover is cut away at 15 to facilitate inspection of the interior of the casing and access thereto. The base of the machine is preferably open at its lower end as indicated at 16 in order that it may be mounted above an opening in the floor of the building in which it is housed in such a manner that the dried solids may fall through this opening into a suitable conveyor or storage chamber. The solids may be subjected to a suitable spray drying operation to remove the last traces of moisture after they are discharged from the bowl if desired. The slurry containing the solids which are to be dried within the rotor is fed to the rotor from above by mechanism indicated generally at 17. The outer wall of the base portion 12 of the casing is connected with an inner shell 19 by means of a plurality of radially extending webs 18, the transmission mechanism by which the rotor and other moving parts of the machine are driven being housed within this inner shell 19.

The main drive shaft 20 of the machine is mounted within the base portion 12 of the casing by any suitable bearing arrangement such as that indicated generally at 21. This main drive shaft is received within an annular housing which communicates with the interior of the inner shell 19 and is provided on its inner end with a bevel gear 22 meshing with a bevel pinion 23 on the lower end of a jack shaft 24. This jack shaft is mounted in bearings 25 which are secured in place in extensions 26 of an upper casing 27 which is secured by bolts 28 to a flange upon the upper end of the inner shell 19. Gears 29 and 30 are keyed to the shaft 24 and mesh with corresponding gears keyed to shafts 31 and 32 respectively which are arranged coaxially of the rotor. The shaft 32 is hollow and the shaft 31 is mounted for independent rotation within this hollow shaft, the shaft 31 being mounted in bearings 33 and 34 secured in a tubular extension of the casing 27 and in the hollow shaft 32 respectively. The shaft 32 is mounted in bearings 35 secured within the tubular extension of the upper casing 27.

The respective ratios of the driven gears on the shafts 31 and 32 to the gears 29 and 30 by which they are driven is such that the solid shaft 31 is driven at a slightly greater speed than the hollow shaft 32. The purpose of this arrangement will be hereinafter explained. The bowl 10 is driven by the hollow shaft 32, these parts being secured together by bolts 37 through which a flange upon the base of the bowl is secured to a corresponding annular flange 36 on the head of the hollow shaft 32. A similar rotating feed head 38, which serves to feed the slurry to the bowl and to move it longitudinally of the bowl by means of plows secured to its outer circumference and extending into close proximity to portions of the inner wall of the bowl, is driven by the solid shaft 31 by means of a flange 39 upon the head of this shaft and bolts 40 which secure the rotating feed head to the flange. The shafts 31 and 32 are packed against the ingress of water and other foreign matter to their bearings by means of packing material 41 secured in annular grooves in collars 42 attached to casing 27 and shaft 32 respectively and encircling the respective shafts packed thereby. The bearings of the transmission mechanism may be lubricated in any suitable manner, a combined force feed and splash lubricating system being illustrated in the drawings.

A liquid receptacle 43 surrounds the rotor and includes a base portion 44 and an upper annular portion 47 secured to this base portion. The base portion is held in place by lugs 45 extending outwardly from the upper part of casing 27, being secured to these lugs by means of bolts or other suitable means. One or more discharge pipes 46 are secured to or form a part of the base portion of the receptacle and pass through an opening in the upper portion 13 of the main frame of the machine in order to discharge liquids therefrom after their separation from the solids in the bowl of the rotor. The base of the receptacle is provided with an inwardly and upwardly extending annular flange 48 which surrounds the upper portion of the casing 27. The upper part 47 of the receptacle is provided at its upper end with an inwardly directed flange 49 which surrounds a conically extending portion of the outer circumference of the main body of the rotor in close proximity thereto.

A hood 50 is secured to the underside of the cover 14 of the main frame of the machine by means of a plurality of bolts 51 which secure it in a position overlying the inwardly turned flange 49 of the upper part 47 of the liquid receptacle. This hood 50 co-acts with the flange 49 to guide solids which are discharged over the upper open edge of the rotor into the main frame of the machine and away from the receptacle 43. The hood 50 is provided with a central opening through which a portion of the feed hopper 52 extends.

The lower end of the hopper is perforated as indicated at 53 and these perforations are flanged inwardly toward the axis of the bowl to form projections against which clusters of large size may be disintegrated as hereinafter explained. A U shaped metal strip 54 is secured in place against the base of the rotating feed head 38 by means of a bolt 56 which may be perforated as indicated to allow lubricant to be fed therethrough to the bearings 34. The clearance between the lowest extremity of the hopper and the base of the feed head is sufficiently small to prevent the passage of unduly large clusters of solids between the base of the feed head and the lowermost extremity of the hopper. Such large clusters are therefore deposited upon the base of the feed head and are accelerated by the U shaped strip 54 and are thrown against the sides of the hopper under the influence of centrifugal force. These clusters strike the sides of the hopper and the inwardly projecting flanges of the openings 53 and are broken up by impact with these hopper parts and thus either projected through the openings 53 or disintegrated to a sufficiently fine form to pass between the lowermost extremity of the hopper and the base of the feed head. In this manner the passage of unduly large solids to the openings which feed them to the bowl is avoided.

The base 57 of the rotating feed head 38 is provided with a plurality of circular feed openings 58 directed diagonally downwardly and outwardly and adapted to feed slurry to the lower portion of the conical wall of the centrifugal rotor. These feed openings are arranged in groups at points approximately 180° removed about the base of the feed head. In the particular machine illustrated in the drawings, there are six feed openings, three of these openings being provided on each side of the rotating head. The base 57 of the feed head is provided with a diagonally inwardly extending flange which forms with the main outer wall of the head an annular receptacle adapted to receive rinse water from a suitable source 59 and directs it under the influence of centrifugal force through openings 60 in the wall of the head which are controlled by weirs 61 such as illustrated in my co-pending application above referred to. These openings and weirs are adapted to direct rinse water against partially dried solids within the rotor. An annular top portion 60 is secured to the feed head 38 or forms an integral part thereof. This top portion surrounds the lower end of the hopper 52 and effectively precludes the possible loss of slurry in its delivery to the feeding head.

The structure of the centrifugal bowl per se is best illustrated in Figures 3 and 6 of the drawings. It has the general form of an inverted frustum of a cone with local departures from this shape for a purpose which will be apparent upon a completion of the description of the machine and its mode of operation. The bowl is formed adjacent its lower end with a stepped horizontal inwardly extending flange through which it is secured to the flange 36 of the hollow shaft 32. It is also provided with an annular downwardly extending flange 62 adjacent this last named flange which surrounds the flange 48 of the base 44 and serves as a liquid deflector. The effective inner wall of the bowl with respect to which centrifugal force operating upon the material within the bowl is generated is divided into a lower conical outwardly extending portion 63, an inwardly extending portion 64 of relatively smaller length with respect to the length of the bowl and a second conical outwardly extending portion 65 beyond this portion 64. A second inwardly extending portion 66 is provided above this last mentioned portion 65. The portion 63 of the bowl is provided with openings 67 adapted to permit the discharge of liquid and the portion 65 is provided with similar openings 68.

A pair of frusto-conical sheet metal plates lie against the portions 63 and 65 of the bowl wall, these plates being perforated and thus constituting screens adapted to effect a separation of liquids from solids within the bowl. The sizes of the perforations may vary in accordance with the material under treatment, the upper screen having perforations larger or smaller than those in the lower screen as circumstances warrant. In the particular form illustrated, the portions 64 and 66 are formed separate from the bowl body, these portions being separate circular rings which are threaded on their outer circumferences and are received within complementally threaded portions of vertically extending parts of the bowl. The rings are formed at their lower ends with conically extending parts of conicity corresponding to that of the portions 63 and 65 of the bowl wall and these lower ends serve to clamp the screens 69 and 70 in place against the inner circumference of the bowl. The ring 64 is provided with a similar projection upon its upper end which serves to clamp the lower end of the screen 70 in place. These rings are provided with depressions and/or projections 72 and 73 respectively which are adapted to co-act with suitable tools in securement of the rings in place. An annular clamp 70' is secured in place by screws or bolts and tends to clamp the base of the screen 69 against the lower end of the inner wall of the bowl. This clamp also serves to secure a ring dam 71 in place at this point. The bowl is provided with openings 74 overlying the flange 61 and adapted to permit the discharge of liquid which overflows the ring dam 71 from the rotor.

The upper end of the rotor is provided on its outer circumference with a downwardly projecting flange 75 adapted to deflect liquid discharging through the openings 68 in the upper part of the rotor downwardly away from the opening between the flange 49 of the upper part 47 of the receptacle and a conical shoulder 76 formed upon the rotor at this point. An annular shield 77, which may be of non-corrosive metal, is secured to ribs 78 upon the inner surface of the member 47 and serves to deflect liquid downwardly and prevent its impingement against the inner wall of the member 47 and the consequent deterioration of the metal of this wall by reason of the effect of the liquid. The ribs 78 are preferably offset angularly in the direction of bowl rotation in such a manner as to deflect downwardly air currents generated by the rotation of the rotor 10. By reason of this downward deflection of the air currents a suction is created within the space between the outer wall of the rotor and the inner wall of the receptacle tending to draw liquid discharged from the rotor in a downward direction. This suction assists materially in the prevention of the discharge of liquid or vapors through the space between the flange 49 of the receptacle and a shoulder 76 of the rotor.

A plurality of plows 79 are provided on the outer circumference of the feed head 38, these plows being arranged in staggered relationship and being set at an angle to the horizontal such that they effect a mechanical feed of the solids over the surfaces 64 and 66 by reason of the differential rotation of the head 38 with respect to the rotor 10. The plows are mounted in brackets 80 which are secured to the side wall of the rotor, slightly in advance of the angular positions occupied by the feed openings. These brackets are slotted adjacent their outer radial extremities and the plows 79 are set in these slots, the plows being secured in adjusted position in the slots by set screws 81 which clamp them in place. It is to be understood that these plows are arranged only in zones spaced longitudinally of the head 38 in alignment with the reversely extending portions 64 and 66 of the bowl. The outer edges of the plows extend into very close proximity to the inner surfaces of the rings 64 and 66' and they may be adjusted by merely releasing the screws 81 and effecting the adjustment manually, and thereafter tightening the screws.

In the operation of the machine, slurry is fed thru the hopper 52 to the rotating feed head 38 and deposited adjacent the base of the rapidly rotating rotor. Centrifugal force due to rotation of the rotor throws the liquid particles outwardly through openings in the lower screen and tends to progress the solid particles upwardly longitudinally of the screen surface, this portion of the bowl wall forming an angle with respect to the vertical which is greater than the normal angle of repose of the solids under treatment. It is to be noted that in this form of the invention I avoid the use of any mechanical scraper or plow whatsoever in connection with this screened portion of the bowl and thus avoid the possibility of wear or abrasion of the surface of the screen incident to the use of such mechanical means. The movement of the solids under centrifugal force is arrested by the surface 64, this surface forming a dam which prevents the movement of the solids further outwardly and upwardly under the influence of centrifugal force. Plows 79 rotating with the feed head 38 at a rate of rotation greater than that of the bowl 10 feed these solids upwardly beyond the surface 64. It will be understood that solids removed from the surface 64 by the plows are immediately replaced by other solids which are forced upwardly and outwardly under the effect of centrifugal force along the screen 69. These solids in turn are replaced by fresh slurry fed through the openings in the rotating feed head, the location of the feed openings directly behind the plows about the periphery of the head insuring the feed of the slurry axially of the bowl before fresh slurry is fed thereto, and thus avoiding rewetting of partially dried solids by the fresh slurry. As the crystals on the screen 69 extend radially inwardly of the innermost radial zone of crystals on the surface 64, the centrifugal force acting on the crystals on screen 69 overcomes any tendency of the crystals on the surface 64 to slide backwardly. Rinse water is applied to the solids while they rest upon the surface 64. It is to be noted that the rotation of the solids during their passage over the screen 69 effects a preliminary removal of the major portion of the moisture in the slurry therefrom.

A certain smaller amount of moisture adheres to the inner side of the screen 69 by reason of surface tension and other phenomena, however, and the reversely extending portion 64 in conjunction with the plows tends to effect a separation between the solids and this liquid which might otherwise be discharged therewith. Thus, while the plows 79 tend to feed the solids upwardly over the edge of this surface 64 onto the second screen 70, the liquid flows readily outwardly under the influence of centrifugal force and down the sloping surface 64 and is thus discharged from the rotor through the opening 67 nearest to the surface 64. There is also a tendency to form a small pool of liquid in the angle between the surface 64 and the screen 69, thus forming a sufficient body of liquid in this zone to defeat the effect of surface tension in this zone in its tendency to retain a film of liquid within the screen. The reversely sloping surface 64 thus tends both to prolong the period under which the slurry is centrifugally treated and to avoid the discharge of this objectionable film of liquid with the solids. The second screen 70 and conically extending surface 66 have much the same effect as the screen 69 and surface 64, these portions of the bowl tending to effect a final drying of the solids and a complete removal of rinse water therefrom. As stated above the perforations of the two screens may be suitably interrelated to allow them to perform their respective roughing out and final drying functions with respect to the particular material under treatment. As the solids are plowed upwardly over the edge of the surface 66 they are discharged outwardly from the rotor under the influence of centrifugal force. The rings 64 may be easily removed and replaced in order to permit a change of screens or the substitution for the rings 64 of other rings of varying dimensions or degrees of conicity.

While my invention is not necessarily limited in principle to any particular bowl dimensions or speeds of bowl rotation, it has found its most effective application in the drying of crystals in connection with bowls of relatively small diameter operating at high speeds. When operated in this manner in the continuous separation of crystals from liquids, only a thin layer of crystals is formed and such a thin layer may be effectively rinsed with a much smaller quantity of rinse water than is necessary in connection with larger bulks of solid material such as those which have been operated upon in machines of the prior art. By reason of the use of such smaller quantities of rinse water, it is possible to effectively rinse the crystals without encountering the objectionable degree of solution and consequent loss of crystals encountered in the use of machines and processes of the prior art.

While I have illustrated the practice of my process by reference to a specific machine it will be obvious that the process is not necessarily limited to the employment of such a machine, as machines operating along somewhat different principles and constructed differently are capable of application in the practice of the process. Thus machines of other designs adapted to perform the steps of feeding solids longitudinally of a centrifugal bowl and thereafter retarding them and/or feeding them toward the axis of the bowl in opposition to the influence of centrifugal force might be designed to perform the process described. While I have illustrated a two-stage bowl, it will be obvious that other multi-stage bowls providing for any number of successive cycles of centrifugal feed followed by retardation may be employed within the spirit of my invention.

Figure 8:
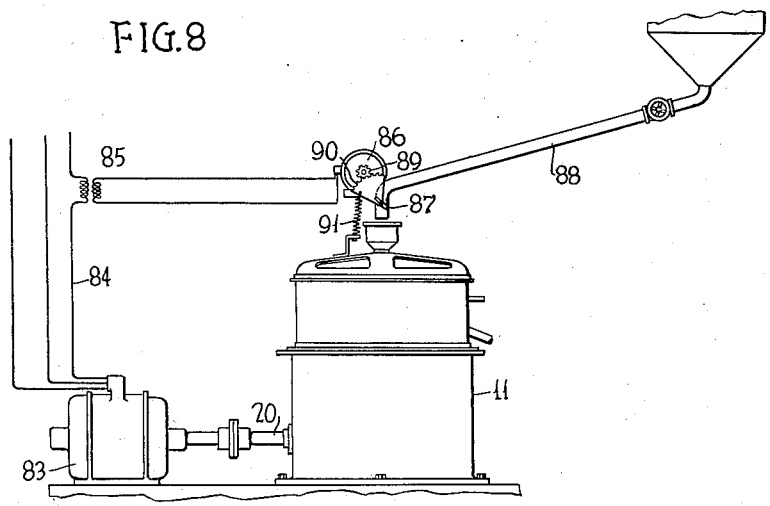
Figure 8 is a side elevation of my improved machine illustrating the adaptation of automatically controlled apparatus for feeding slurry thereto.
Figure 9:
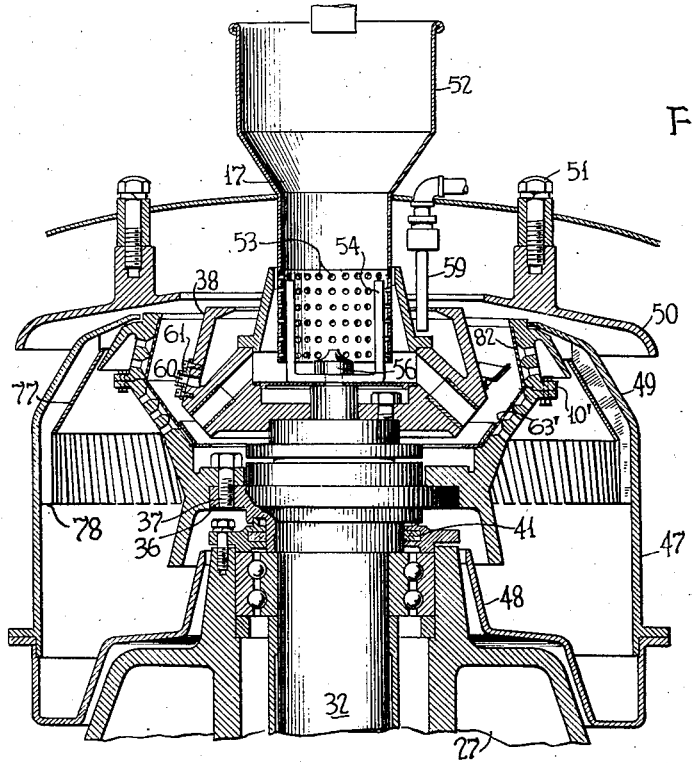
Figure 9 is a central longitudinal section through a slightly modified form of bowl.

While I have described my invention in connection with a bowl in which two stages of straining are followed successively by two stages of reverse movement of the solids toward the axis of the bowl, I wish it to be understood that a single stage bowl such as that illustrated in Figure 9 might be used in the practice of my invention. In this example, I have illustrated a bowl having an outwardly flaring conical portion 63' corresponding to the outwardly flaring portion 63 of the bowl 10' and a conical inwardly directed screened portion 82 above this portion 63'. In the use of this type of bowl the rinse water is applied in the neighborhood of the screen section 82, the preliminary drying being effected in zone 63' in much the same manner as it is effected in the zone 63 of the bowl previously described. In this case as in the other, the solids are fed upwardly over the inverted conical section by means of plows and the liquids tending to adhere thereto are removed by centrifugal force during this upward movement. A separation of the rinse water as well as the difficultly separable tension film is therefore effected in the zone of the screened portion 82 of the bowl. The bowl is formed in two parts as illustrated to facilitate assembly. In this form of the invention a large number of plows are preferably employed, each plow feeding the solids but a small portion of the longitudinal extent of the bowl. The solids are thus retained in the upper screened portion for a considerable period in order to effect a degree of drying comparable to that obtained in the multi-stage bowl of the principal form of my invention. This machine is otherwise similar in design to that illustrated in the embodiment of my invention chosen as its principal form for the purpose of illustration. In Figure 8, I have disclosed automatic means which may be used for feeding slurry to the bowl. The bowl is driven by means of the motor 83 fed by alternating current from line 84. A transformer 85 is interposed in this line and a torque motor 86 is driven by current induced through the transformer. The torque motor controls a butterfly valve 87 by means of a pinion 89 and segmental rack 90 in opposition to the effect of a spring 91 operating upon the rack. The position of the butterfly valve in the conduit 88 which feeds slurry to the machine is thus directly controlled by the torque produced by the motor which drives the centrifugal rotor.

Modifications pertaining both to the machine and to the process will be obvious to those skilled in the art. I do not, therefore, wish to be limited in the interpretation of my invention except by the scope of the subjoined claims as interpreted in the light of the broad generic spirit of my invention.

I claim:

1. In a machine for separating liquids from solids, a centrifugal rotor including a conically extending strainer section in which a preliminary separation of the constituents is adapted to take place during the feed of a slurry of solids and liquids longitudinally therethrough toward the portion of larger diameter under the influence of centrifugal force, a second section of opposite conicity with respect to said first named section beyond the larger end of said first named section adapted to retard the feed of slurry longitudinally of said first named section, means located adjacent said section of opposite conicity for rinsing partially dried solids during their passage through the rotor, and a third conically extending section having a conicity similar to that of said first named section beyond said second named section, said third conically extending section being perforated to allow liquid to pass therethrough.

2. In a machine for separating liquids from solids, a centrifugal rotor including a conically extending section in which a preliminary separation of the constituents is adapted to take place during the feed of a slurry of solids and liquids longitudinally therethrough toward the portion of larger diameter under the influence of centrifugal force, a section of opposite conicity with respect to said first named section beyond the larger end of said first named section adapted to retard the feed of slurry longitudinally of said first named section, means located adjacent said section of opposite conicity for rinsing partially dried solids during their passage through the rotor, and a second conically extending section having a conicity similar to that of said first named section beyond said last named section, said second similar conically extending section being perforated to allow liquid to pass therethrough.

3. In a machine for effecting continuous separation of liquids from solids, a centrifugal rotor including a section in which a preliminary separation of liquids from solids is adapted to take place during the flow of material therethrough, means of limited circumferential extent for continuously feeding slurry to said section, means longitudinally removed from said section for retarding the flow of material therethrough, and continuously operative means of limited circumferential extent for impelling material past said last-named means, said feeding means and said impelling means being mounted for common rotation with respect to the rotor, said impelling means being mounted slightly forwardly of said feeding means in the direction of relative rotation of the impelling and feeding means with respect to the rotor.

4. In a machine for effecting continuous separation of liquids from solids, a centrifugal rotor including a conically extending section in which a preliminary separation of liquids from solids is adapted to take place during the flow of material longitudinally therethrough toward the portion of larger diameter under the influence of centrifugal force, means for continuously feeding slurry to said section, a section of opposite conicity with respect to said first-named section beyond the larger end of said first-named section adapted to retard the feed of slurry longitudinally of said first-named section, continuously operative means for impelling material past said section of opposite conicity, and means for applying rinse liquid directly to material upon said section of opposite conicity.

5. A centrifugal separator adapted to effect a separation of solids from liquids including, in combination, a rotor, a rotatable head adapted to effect the feed of material to said rotor, means rotatable with said head adapted to impact material fed to said head, and means surrounding said impacting means and adapted to be impacted by material projected thereagainst by said impacting means prior to its feed to said rotor.

6. A centrifugal separator adapted to effect a separation of solids from liquids including, in combination, a rotor, a rotatable head adapted to effect the feed of material to said rotor, means rotatable with said head adapted to impact material fed to said head, and means surrounding said impacting means and adapted to be impacted by material projected thereagainst by said impacting means prior to its feed to said rotor, said last-named means being provided with a disintegrating surface adapted to break up clusters of material projected thereagainst.

7. A centrifugal separator adapted to effect a separation of solids from liquids including, in combination, a rotor, a rotatable head adapted to effect the feed of material to said rotor, means rotatable with said head adapted to impact material fed to said head, and means surrounding said impacting means and adapted to be impacted by material projected thereagainst by said impacting means prior to its feed to said rotor, said last-named means being provided with perforations adapted to break up clusters of material projected thereagainst.

8. A centrifugal separator adapted to effect a separation of solids from liquids including, in combination, a rotor, a rotatable head adapted to effect the feed of material to said rotor, means rotatable with said head adapted to impact material fed to said head, and means closely surrounding said impacting means and adapted to be impacted by material projected thereagainst by said impacting means prior to its feed to said rotor.

9. A centrifugal separator adapted to effect a separation of solids from liquids including, in combination, a rotor, a rotatable head adapted to effect the feed of material to said rotor, a U-shaped strip rotatable with said head and adapted to impact material fed to said head, and means surrounding said U-shaped strip and adapted to be impacted by material projected thereagainst by said U-shaped strip prior to its feed to said rotor.

NATHANIEL BREWER.